United States Patent
Marzolla (10) Patent No.: US 11,784,848 B2
(45) Date of Patent: Oct. 10, 2023

(54) METHOD OF ASSIGNING AN OPERATIVE ADDRESS

(71) Applicant: CAREL INDUSTRIES S.p.A., Brugine (IT)

(72) Inventor: Luca Marzolla, Brugine (IT)

(73) Assignee: CAREL INDUSTRIES S.P.A., Brugine (IT)

( * ) Notice: Subject to any disclaimer, the term of this patent is extended or adjusted under 35 U.S.C. 154(b) by 0 days.

(21) Appl. No.: 17/999,970

(22) PCT Filed: May 26, 2021

(86) PCT No.: PCT/IB2021/054569
§ 371 (c)(1),
(2) Date: Nov. 28, 2022

(87) PCT Pub. No.: WO2021/240380
PCT Pub. Date: Dec. 2, 2021

(65) Prior Publication Data
US 2023/0246873 A1      Aug. 3, 2023

(30) Foreign Application Priority Data

May 26, 2020   (IT) .................... 102020000012328

(51) Int. Cl.
*H04L 12/40*       (2006.01)
*H04L 61/5038*   (2022.01)
(52) U.S. Cl.
CPC .......... *H04L 12/40* (2013.01); *H04L 61/5038* (2022.05); *H04L 2012/40228* (2013.01)
(58) Field of Classification Search
CPC ................ H04L 12/40; H04L 61/5038; H04L 2012/40228
See application file for complete search history.

(56) References Cited

U.S. PATENT DOCUMENTS 10,594,607 B2 *  3/2020  Yu ........................... H04L 47/11
10,805,262 B1 * 10/2020  Fayfield ............. H04L 61/5069
(Continued)

FOREIGN PATENT DOCUMENTS

CN     108737590 A    11/2018
CN     109936640 A     6/2019

OTHER PUBLICATIONS

International Search Report & Written Opinion dated Aug. 27, 2021 from PCT Application No. PCT/IB2021/054569.

*Primary Examiner* — Sargon N Nano
(74) *Attorney, Agent, or Firm* — INNOVATION CAPITAL LAW GROUP, LLP; Vic Lin (57) ABSTRACT

Described is a method for assigning an operational address to at least one slave device (20) of a plurality of slave devices by a master device (10) according to a serial communication protocol. The method comprises the following steps: —a step A wherein said master device (10) sends a first operational communication in said broadcast mode —a step B wherein each slave device (20*i*) of said plurality of slave devices (20) having received said first operational communication, assigns a value to said random number —a step C wherein said master device (10) for each of said identification communications, transmits in said broadcast mode a second operational communication; —a step D wherein each slave device (20*i*) of said plurality of slave devices (20) which receives said second operational communication acquires as its operational address the unique address (U_AD) contained in said second operational communication and passes to said addressed state.

18 Claims, 3 Drawing Sheets

(56) References Cited

U.S. PATENT DOCUMENTS

| | | | | |
|---|---|---|---|---|
| 2010/0299401 A1* | 11/2010 | Lloyd | ............... | H04L 12/40117 |
| | | | | 709/209 |
| 2012/0271924 A1* | 10/2012 | Spitaels | .............. | H04L 61/5092 |
| | | | | 709/220 |
| 2013/0326099 A1* | 12/2013 | Schmidt | .............. | H04L 61/5038 |
| | | | | 710/110 |
| 2014/0052863 A1* | 2/2014 | Hart | .................... | H04L 61/5038 |
| | | | | 709/226 |
| 2017/0235848 A1* | 8/2017 | Van Dusen | ........... | G06F 16/904 |
| | | | | 705/12 |
| 2020/0125515 A1* | 4/2020 | Jost | ....................... | G06F 13/362 |

* cited by examiner

METHOD OF ASSIGNING AN OPERATIVE ADDRESS

This invention relates to the field of communication for electronic systems with "master/slave" architecture operating according to a serial communication protocol. In particular, the invention relates to a method of assigning an operational address. The invention further relates to a master device configured or programmed to perform the above method and to an electronic system having a "master/slave" architecture, operating according to a serial communication protocol and comprising a plurality of slave devices, and a master device configured or programmed to perform the above-mentioned method.

The scope of the invention does not extend to the communication protocols which use already defined procedures, methods or addressing protocols, such as the case of the TCP/IP using DHCP protocol.

Particularly in the industrial automation sector, analogue and/or digital electronic systems are known which have a "mater/slave" architecture, whereby a main device, called a "master" device, exercises control over one or more peripheral devices, called "slave" devices, with which it communicates. Normally, the electronic systems having "mater/slave" type architecture comprise a plurality of "slave" devices connected to a "master" device which acts as a central coordination and control unit for a plurality of "slave" devices. For example, the master device may be a PLC controller and the plurality of slave devices may be measuring devices or instruments.

In recent decades, various communication protocols have been developed for electronic systems with a master/slave type architecture. These communication protocols define the mode of interaction, that is to say the method of data exchange, between the master device and the slave devices of an electronic system with "master/slave" architecture, and make use of different transmission circuits for the realisation of at least one data transmission channel between the master device and the slave devices.

In this context, the serial communication protocols have become particularly important for their robustness, economy and interference tolerance. In the electronic systems with "master/slave" architecture operating according to a serial communication protocol, the communication is based on a flow of bits transferred over a single transmission channel.

Among the serial communication protocols, the serial versions of the Modbus protocol, that is, Modbus RTU and Modbus ASCII, have now assumed the de facto standard status. Other widely used serial communication protocols are, for example, the Inter Integrated Circuit (I2C) protocol and the Serial Peripheral Interface (SPI) protocol.

In an electronic system with a master/slave architecture operating according to a serial communication protocol, the master device exercises control over the slave devices by sending a so-called operational communication in broadcast mode, that is, a message containing a command or instruction addressed without distinction to all the slave devices, or a so-called operational communication in addressed mode, that is, a message containing a command or instruction addressed to a specific slave device.

In order for an operational communication in addressed mode to be received only by the slave device for which it is specifically intended, a unique coupling must be established between the above-mentioned operational communication and this slave device.

For this purpose, each slave device of the electronic system must be assigned an operational address that uniquely identifies it and this same operational address must be contained in the operational communications addressed to it. The assignment of the operational address to each of the slave devices of an electronic system is therefore essential to ensure the correct operation of the electronic system itself.

The serial communication protocols therefore require the implementation of a procedure for assigning an operational address to the slave devices to allow specific communication to a particular slave device addressed to the latter via its operational address.

The assignment of the operational address to the slave devices of an electronic system operating according to a serial communication protocol generally occurs when the electronic system is installed, if one of the slave devices goes offline or if a slave device has to be replaced due to damage or breakage or for other reasons.

Traditionally, the assignment of the operational address can be done manually by an operator. However, as well as being very time-consuming to complete, a manual assignment by an operator obviously lends itself to human error.

In order to overcome this drawback, methods of assigning an operational address have been developed which can be implemented autonomously by an electronic system with a "master/slave" type architecture operating according to a serial communication protocol.

In particular, in the context of the prior art, such methods of assigning an operational address which can be implemented autonomously by an electronic system with architecture of the "master/slave" type operating according to a serial communication protocol, it is envisaged that the master device requests to the plurality of slave devices of the same electronic system that each of them, if it is in an unaddressed state, sends to the master device an identification communication containing its own unique identifier, starting from an initial instant chosen by the same slave device in a random manner, within a certain time period. In the context of the invention, the expression "unique identifier" means a code, for example a numerical or alphanumerical code, which allows each slave device of the plurality of slave devices to be identified or uniquely identified or individually identified. The unique identifier can for example be a "Universally unique identifier" (UUID), or a similar MAC address (Media Access Control address). Thus, the unique identifier uniquely identifies each slave device of the plurality of slave devices and this identification communication is used by the master device as the starting data set for assigning an operational address.

The identification communication containing the unique identifier of a slave device has its own duration. Generally, this duration is of the order of thousandths of a second.

Although the duration of the identification communications may be considered short, the transmission of the identification communications starting from a random instant results in the fact that an identification communication of a first slave device and that of a second slave device may be completely overlapped or partially overlapped, that is to say, they are transmitted at least partially at the same time. For this reason, in such cases, the data contained in an identification communication may mix, respectively completely or partially, with the data of at least a further identification communication, rendering the communication undecipherable for the master device receiving it.

If the data are completely mixed, that is, if at least two identification communications are substantially simultaneous, the master device is able to recognise the error. For example, in the case of serial versions of the Modbus protocol, the master devices are usually programmed or configured to perform a check aimed at identifying random errors in the data transmission, such as a cyclic redundancy check (CRC). In this case, having recognised the error, the master device does not assign any operational address to the respective slave devices from which the identification communications started, substantially simultaneously.

If the data are only partially mixed, the master device is not always able to recognise the error. The partial overlapping of identification communications by two or more different slave devices is difficult to identify by the master device. In some of these cases, the master device may consider that it has correctly received a single and valid identification communication and issue an order to assign an operational address which is then received by several slave devices with the consequence of assigning the same identical operational address to the various slave devices from which the identification communications have actually been transmitted, with a partial overlap.

If the same operational address is assigned to two or more different slave devices, at least one of them will receive operational communications in addressed mode from the master device. In such a case, the command contained in the operational communication of the master device may be correctly processed and executed, depending on what is given and the type of response expected. In general, however, if the same operational address is assigned to two or more slave devices, there is a very high probability of communication problems or network errors. There is therefore currently a strong need to improve the process implemented by an electronic system with a "master/slave" type architecture operating according to a serial communication protocol to assign an operational address to the slave devices of the same electronic system; in particular, the need is to reduce the risk of incorrectly assigning an operational address to one or more slave devices of the same electronic system.

The problem underlying the invention is, therefore, to satisfy the above-mentioned requirement.

The main purpose of the invention is therefore to develop a method of assigning an operational address which solves this problem by overcoming the drawbacks described above with reference to the prior art.

In the context of this task, it is the aim of the invention to propose a method of assigning an operational address, which can be implemented autonomously or automatically, by an electronic system with a "master/slave" type architecture operating according to a serial communication protocol, which makes it possible to reduce the number of possible incorrect assignments of an operational address to two or more slave devices.

This task, as well as these and other aims which will appear more clearly below, are achieved by a method of assigning an operational address which can be implemented by an electronic system with a "master/slave" type architecture operating according to a serial communication protocol. An object of the invention is also a master device configured or programmed to implement the method of assigning an operational address according to the invention and an electronic system having a "master/slave" type architecture operating according to a serial communication protocol configured or programmed to implement the method of assigning an operational address according to the invention.

Detailed features of the method of assigning an operational address according to the invention are indicated in the corresponding dependent claims.

Further features and advantages of the invention will become more apparent from the description of a preferred, but not exclusive, embodiment of a method of assigning an operational address.

The scope of the invention does not extend to the communication protocols which use already defined procedures, methods or addressing protocols, such as the case of the TCP/IP using DHCP protocol.

Also attached to invention, provided by way of example, are the accompanying drawings, in which.

Figure 1:
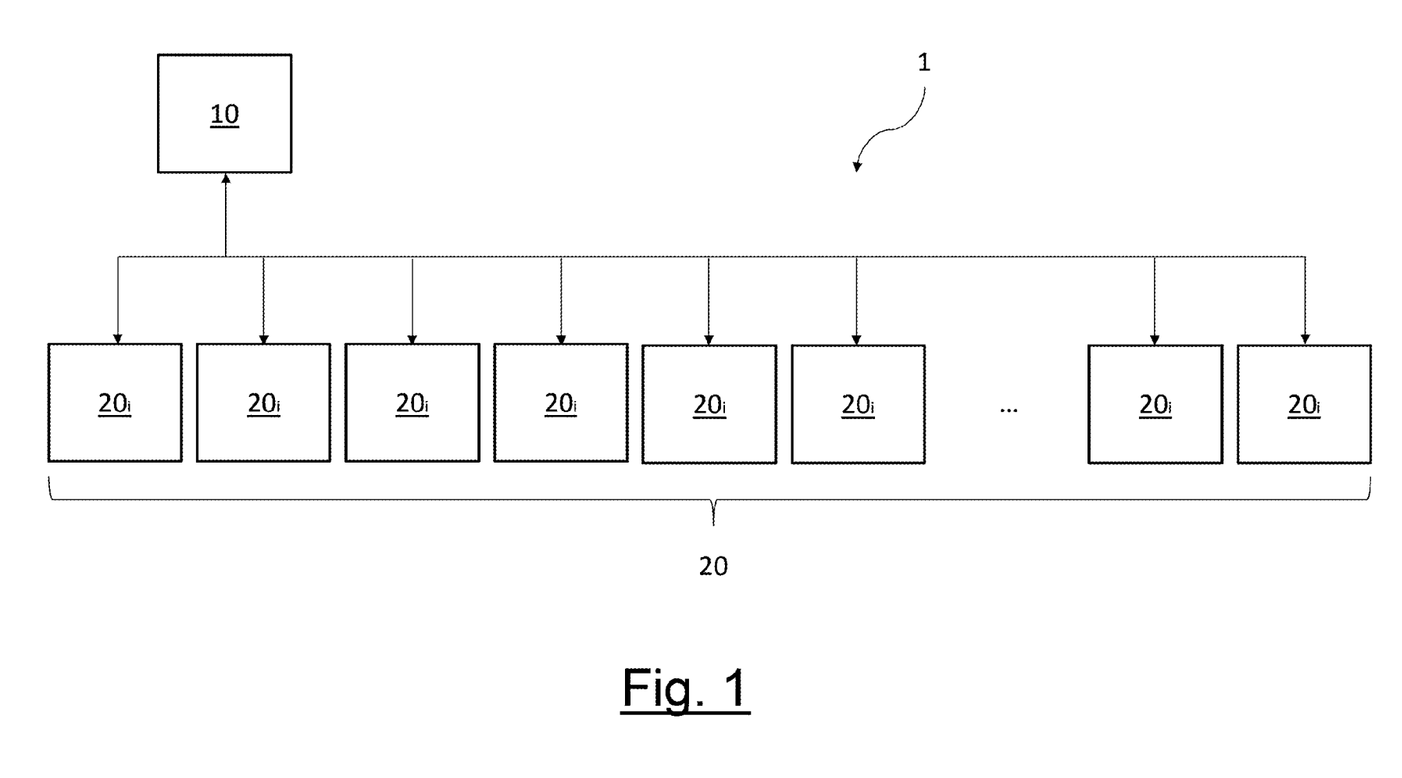
FIG. 1 illustrates a diagram of an electronic system with a "master/slave" architecture according to the invention.

The method according to the invention can be implemented by an electronic system 1 having a master/slave architecture operating according to a serial communication protocol comprising a master device 10 and a plurality of slave devices 20. In particular, if the serial communication protocol is a version of the Modbus protocol, such as Modbus RTU and Modbus ASCII, the electronic system 1 with the master/slave architecture can comprise one master device 10 connected to a maximum of 247 slave devices $20_i$.

According to the operating principle of an electronic system with a "master/slave" architecture, which is inherently traditional, the master device 10 can exercise full control over the plurality of slave devices 20. That is to say, the master device 10 can act as a central coordination and control unit for the plurality of slave devices 20.

Each slave device $20_i$ has, that is to say, is equipped, with its own unique identifier. The unique identifier is a number that individually identifies each slave device $20_i$. In the context of the invention, the expression "unique identifier" means a code, for example a numerical or alphanumerical code, which allows each slave device of the plurality of slave devices to be identified or uniquely identified. The unique identifier can be, for example, a "universally unique identifier" (UUID), or a similar MAC address (Media Access Control address), or the serial number which is generally assigned to a slave device by the manufacturer.

Each slave device $20_i$ is connected to the master device 10 for mutual communication. That is to say, the master device 10 and the plurality of slave devices 20 are mutually connected to interact with each other by exchanging communications, according to the serial communication protocol. In particular, in the case wherein the serial communication protocol is a serial version of the Modbus protocol, this connection can take place by means of a single bus which constitutes the transmission channel through which these communications are reciprocally exchanged.

The communication in an electronic system 1 with master/slave architecture operated according to a serial communication protocol can, as usual, be initialised by the master device 10. That is to say, the first communication can be transmitted from the master device 10 to one or more of the slave devices 20i. The communication by the master device 10 may comprise transmitting an operational communication, that is, a communication containing a command or instruction, to a single specific slave device $20_i$ or to the entire plurality of slave devices 20 jointly.

In line with this, the master device 10 is configured to send an operational communication in broadcast mode; that is, an operational communication containing a command or instruction that is not addressed, that is to say, does not include an identifier of a recipient slave device so that any slave device of the plurality of slave devices 20 receives it and treats it as a command addressed to itself.

In other words, a command or instruction contained in a broadcast mode communication may be is treated as if it were addressed without distinction to the entire plurality of slave devices 20. Moreover, the master device 10 may preferably be configured or programmed to send an operational communication in an addressed mode; that is, an operational communication containing a command or instruction specifically addressed to a slave device $20_i$ of the entire plurality of slave devices 20. That is to say, the master device 10 may additionally be configured or programmed to send an operational communication in addressed mode, that is, a message containing a command or instruction addressed to a specific slave device $20_i$.

In order for the operational communications to be received by each slave device $20_i$ of the plurality of slave devices 20 or by a specific slave device $20_i$, the operational communications also contain an operational address.

The operational address may be one of the fields of an operational communication allowing the same communication to be addressed, uniquely, to a specific slave device $20_i$ or to the entire plurality of slave devices 20. Preferably, according to the serial versions of the Modbus protocol, the operational address can be contained as the first byte of each "packet" constituting an operational communication in addressed mode. Preferably according to the serial versions of the Modbus protocol, the operational address can be a numerical address.

In order to be received by all the slave devices $20_i$ of the plurality of slave devices 20 indistinctly, an operational communication in broadcast mode preferably may include, in addition to the above command, a generic or universal address. This generic or universal address is an address valid simultaneously for all the slave devices $20_i$ of the plurality of slave devices 20.

In other words, an operational communication that includes such a generic or universal address is treated by each slave device $20_i$ which receives it as a communication addressed to itself.

Preferably, in the serial versions of the Modbus protocol, this generic or universal address can be set to "0" by default.

On the other hand, in order to be received by only one specific slave device $20_i$ of the plurality of slave devices 20, an operational communication in addressed mode preferably may include an operational address uniquely referring to or associated with the specific slave device $20_i$, that is, an operational address designed to uniquely identify the specific slave device $20_i$ of the plurality of slave devices 20. Preferably, in the case of serial versions of the Modbus protocol, the operational address can have an integer numerical value of between 1 and 247. Each slave device $20_i$ of the plurality of slave devices 20 is configured or programmed to be selectively in an addressed state or an unaddressed state.

That is to say, each slave device $20_i$ can be in either an addressed or an unaddressed state where in the unaddressed state it has an assigned operational address and in the unaddressed state it has no operational address. In the unassigned state, therefore, a slave device does not have an operational address that uniquely identifies it. That is to say, in the unaddressed state, a slave device $20_i$ is "anonymous", that is, not uniquely identifiable by the master device 10. In the unaddressed state, although a slave device $20_i$ has its own unique identifier, it is still unknown or unrecognisable by the master device 10. Therefore, if a $20_i$ slave device is in an unaddressed state it will only receive operational communications in broadcast mode from the master device 10.

On the other hand, in the addressed state a $20_i$ slave device has its own operational address. In other words, the state addressed to a slave device $20_i$ corresponds to an operational address that uniquely identifies it for the master device 10. Thus, in the addressed state, a slave device $20_i$ can be individually recognised by the master device 10 via its relative operational address. As mentioned above, preferably in a serial version of the Modbus protocol, an operational address is normally a whole number of between 1 and 247. If a slave device $20_i$ is in an addressed state, it can receive both operational communications in broadcast mode and operational communications in addressed mode from the master device 10.

Generally, one or more slave devices $20_i$ of the plurality of slave devices 20 is/are in an unaddressed state at the time of installation or set up of the electronic system with "master/slave" type architecture 1. Other cases wherein which a slave device $20_i$ may be in the unaddressed state are, for example, when there is a sudden malfunction such that the slave device $20_i$ disconnects from the network, when maintenance or replacement of a slave device is required, or when one of the slave devices goes offline. In order for each slave device $20_i$ of the plurality of slave devices 20 to have an operational address so that it can receive operational communications exclusively intended for it, an assignment of such an operational address must be performed.

In whatever state, addressed or unaddressed, each slave device $20_i$ of the plurality of slave devices 20 is located, it is configured or programmed to execute the commands of the master device 10. In particular, each slave device $20i$ of the plurality of slave devices 20 is configured or programmed to execute commands contained in an operational communication in broadcast mode. For example, in response to an operational communication in broadcast mode, a $20_i$ slave device may send an identification communication, or a confirmation communication.

Preferably, each slave device $20_i$ of the plurality of slave devices 20 may also be configured or programmed to execute commands contained in an operational communication in addressed mode, if its operational address coincides with the operational address contained in the operational communication.

Figure 3:
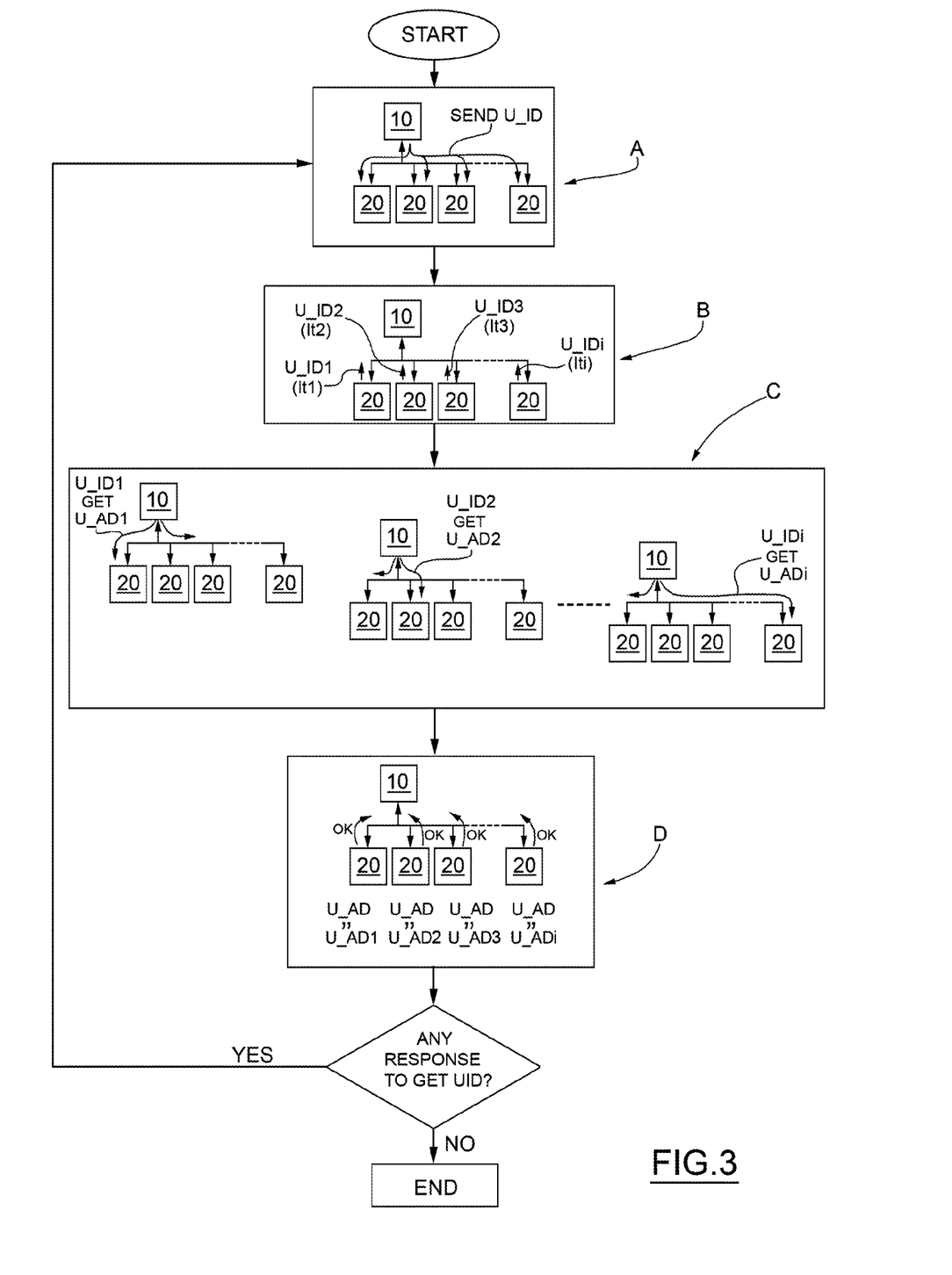
FIG. 3 illustrates an flowchart of the method of assigning an operational address according to the invention.

The method according to the invention is a method of assigning an operational address to at least one slave device $20_i$ of a plurality of slave devices by a master device 20 according to a serial communication protocol.

This method comprises at least the following steps: a step A, a step B, a step C and a step D as specified below.

Figure 2:
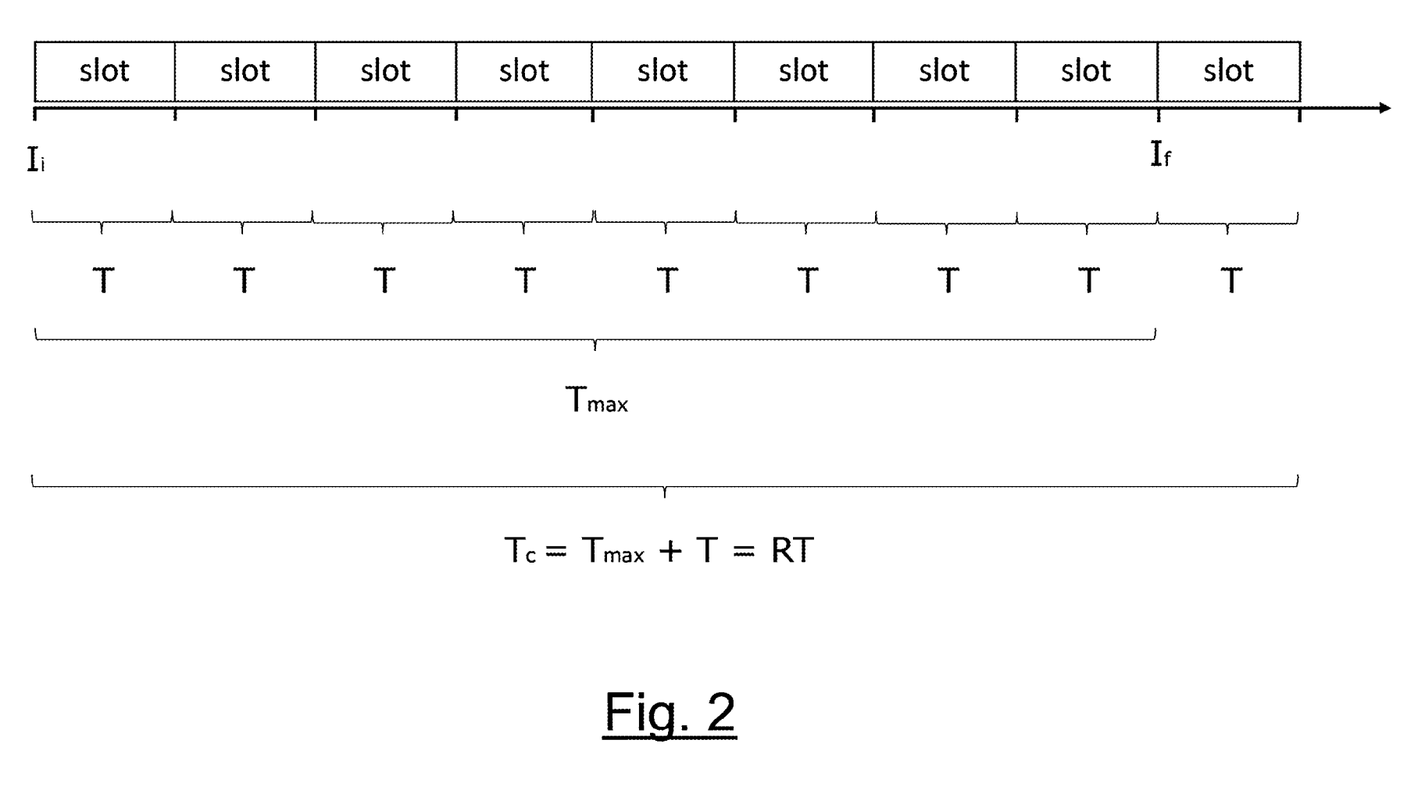
FIG. 2 illustrates by means of a diagram the relationship between initial instant, final instant, time interval, maximum time period, total time period, slot.

In step A, the master device 10 sends a first operational communication in broadcast mode; this contains a command for all the plurality of slave devices 20, to transmit the unique identifier U_ID at a transmission instant $I_t$. That is to say, the master device 10 sends a first operational communication without distinction to all slave devices $20_i$ of the plurality of slave devices 20 requesting each of them to send its unique identifier U_ID, at a transmission instant $I_t$. The first operational communication from the master device 10 therefore requires the plurality of slave devices 20 to transmit their unique identifier U_ID at a given transmission time $I_t$. This instant of transmission $I_t$ must be between an initial instant $I_i$ and a final instant $I_f$. That is, the instant of transmission $I_t$ falls within a maximum time period $T_{max}$ from an initial instant $I_i$. In other words, the transmission of the unique identifier U_ID must start within a maximum time period $T_{max}$ between the initial instant $I_i$ and the final instant $I_f$. The maximum time period $T_{max}$ represents the maximum interval within which the transmission of the unique identifier U_ID by a slave device $20_i$ can start.

This instant of transmission $I_t$ has a value in units of time, with respect to the initial instant $I_i$, equal to the product of a random number r by or a predefined time interval T; where this random number r is a natural number. Thus, the transmission of the unique identifier U_ID must take place, with respect to the initial instant $I_i$, at a time that is a multiple of the time interval T. That is to say, the instant of transmission $I_t$ may coincide with the initial instant $I_i$ or be delayed with respect to the initial instant $I_i$ by a time equal to the repetition, by a random number of times r, of the duration of that time interval T. That is to say, in order to start transmitting its unique identifier U_ID, a slave device $20_i$ must wait for the time interval T to have elapsed a number of times r.

For example, assuming that the time interval T is 20 ms, and the value assigned to the number r by a $20_i$ slave device is 47, then the instant of transmission $I_t$ is 0.020 s×47=0.94 s after the initial instant $I_i$. If a slave device $20_i$ assigns the value 0 to the number r, the transmission instant $I_t$ is 0; that is, the transmission instant $I_t$ coincides with the initial instant $I_i$.

Thus, during step A, the master device 10 imposes a cadence, within the maximum time period $T_{max}$, for the start of transmission of the unique identifier U_ID by the slave devices 20i. According to this cadence, each transmission instant $I_t$ may, therefore be separated with respect to a subsequent of transmission instant $I_{t'}$ by a zero time or equal to at least the duration of the time interval T or by a time equal to a multiple of the duration of the time interval T. All the slave devices $20_i$ of the plurality of slave devices 20 receive the operational communication sent by the master device 10 in the step A, in broadcast mode, but only the slave devices $20_i$ which are in an unaddressed state, that is, which have not previously been assigned an operational address, perform the steps B and D of the method according to the invention. That is to say, only if a $20_i$ slave device is in the unaddressed state are steps B and D of this method performed. In particular, in step B, each slave device $20_i$ of the plurality of slave devices 20 that has received the first operational communication, if it is in the unaddressed state, assigns a value to the random number r and transmits, starting from the transmission instant $I_t$, an identification communication containing the unique identifier U_ID of the slave device $20_i$. In other words, each slave device $20_i$, in an unaddressed state, responds to the first operational communication of the master device 10 including the relative unique identifier U_ID in an identification communication, choosing a value to be assigned to the random number r, and, finally transmitting the identification communication starting from the transmission instant $I_t$.

In particular, the time interval T has a duration substantially equal to a duration of the identification communication such that if at least a first slave device $20_a$ of the slave devices $20_i$ and at least a second slave device $20_b$ of the slave devices $20_i$ each transmit a relative identification communication at a first initial instant $I_{t,a}$ and at a second initial instant $I_{t,b}$, respectively, the master device 10 either receives a corrupted response formed by a substantially complete overlap of the identification communications of the first and second slave devices $20_a$ and $20_b$ if the first initial instant $I_{t,a}$ is equal to the second initial instant $I_{t,b}$, or receives the non-overlapping identification communications of the slave devices $20_a$ and $20_b$ if the first initial instant $I_{t,a}$ is different from the second initial instant $I_{t,b}$.

That is to say, the time interval T is almost as long as the duration of transmission of an identification communication of a slave device $20_i$. In this way, it is ensured that starting from the transmission instant $I_t$ and after a time equal to the duration of the time interval T, an entire identification communication of a slave device $20_i$ can be transmitted.

That is to say, advantageously, if at least a first slave device $20_a$ and a second slave device $20_b$ each transmit their own identification communication at a first initial instant $I_{t,a}$ and a second initial instant $I_{t,b}$ respectively, two alternative cases may occur.

In a first case, the first initial instant $I_{t,a}$ coincides with the second initial instant $I_{t,b}$ and therefore, the transmission of the identification communications by the first slave device $20_a$ and the second slave device $20_b$ occur substantially simultaneously. For this reason, the master device 10 receives the identification communications almost simultaneously. In other words, the master device 10 receives a corrupted response due to the substantially complete overlapping of the identification communications; that is, there may be a conflict of data contained in the identification communication of the first slave device $20_a$ and the second slave device $20_b$. The data contained in the identification communications of the first slave device $20_a$ and the data contained in the identification communication of the second slave device $20_b$ are received by the master device 10 substantially overlapping with each other and, therefore, cannot be processed by it.

That is to say, the master device 10, receiving at almost the same time the identification communication of the first slave device $20_a$ and the identification communication of the second slave device $20_b$ is not able to distinguish whether the data contained in each of them refer to the first slave device $20_a$ or to the second slave device $20_b$; in particular, the master device 10 is not able to verify the correctness of the data contained in the overlapping identification communications.

In the second case, however, the first initial instant $I_{t,a}$ and the second initial instant $I_{t,b}$ differ from each other; therefore, the transmission of the identification communications by the first slave device $20_a$ and the second slave device $20_b$ occurs during a first time interval $T_a$ and a second time interval $T_b$, respectively, which are distinct from each other. The identification communication of the first slave device $20_a$ and the second slave device $20_b$, respectively, are then transmitted separately.

The master device 10, in this second case, receives the non-overlapping identification communications of these slave devices $20_a$ and $20_b$. That is to say, the identification communications of the first slave device $20_a$ and the second slave device $20_b$, respectively, are received separately or distinctly from each other.

Advantageously, the sending of partially overlapping identification communications is prevented. That is to say, a transmission of a respective partially overlapping identification communication by two slave devices $20_i$ is prevented. In other words, in accordance with a method according to the invention, the start of transmission of an identification communication by a first slave device $20_a$ cannot occur during the time period in which transmission of another identification communication by a second slave device $20_b$ is in progress. It follows that the transmission of the unique identifier U_ID by the plurality of slave devices 20 may be cadenced within a total time period $T_c$ with a duration equal to the sum of the duration of the maximum time period $T_{max}$ and the duration of the time period T.

Since the reception by the master device is almost instantaneous, the overall time period $T_c$ represents, in addition, the overall waiting time of the master device 10 to receive a response from the plurality of slave devices 20.

For example, if $T_{max}$ has a duration of 1000 ms and T has a duration of 50 ms, then the total time period $T_c$ will have a duration of 1050 ms.

In step C, the master device 10 for each identification communication it receives and which does not form a corrupted response, transmits in broadcast mode a second operational communication. In other words, for each identification communication received distinctly or separately from at least one other identification communication, the master device 10 sends to the plurality of slave devices 20 a second operational communication.

In particular, each second operational communication consists of a response to each identification communication that contains the same unique identifier U_ID as the latter and, further, a unique address U_AD, for example, a Modbus address, to be associated with the slave device $20_i$ of the plurality of slave devices 20 that has that unique identifier U_ID. That is to say, each second operational communication contains: a unique identifier U_ID, which corresponds to that transmitted in one of the response communications that does not form a corrupted response, and a unique address U_AD to be assigned to the slave device of the plurality of slave devices 20 to which that unique identifier U_ID corresponds. In other words, a second operational communication contains the combination of a unique address U_AD and a specific unique identifier U_ID; where the unique address U_AD must be assigned to the slave device $20_i$ to which the specific unique identifier U_ID corresponds. In other words, for each slave device $20i$ whose identification communication to the first operational communication does not form a corrupted response, the master device 10 emits a second operational communication that assigns to that slave device $20_i$ a unique address U_AD that is different from any unique address U_AD assigned or that will be assigned to the other slave devices $20_i$.

In step D, the operational address is assigned to the slave devices $20_i$ of the plurality of slave devices 20 whose identification communication was not part of a corrupted response. In particular, in step D, each slave device of the plurality of slave devices 20 which receives the second operational communication, if it is in the unaddressed state and its unique identifier U_ID coincides with the unique identifier U_ID contained in the second operational communication, acquires as its operational address the unique address U_AD contained in the second operational communication and passes to the addressed state. In step D, each slave device $20_i$ of the plurality of slave devices 20 which receives the second operational communication compares the unique identifier U_ID contained in that second operational communication with its own unique identifier U_ID. Thus, if the unique identifier U_ID contained in the second operational communication coincides with its own unique identifier U_ID, then the slave device $20_i$ sets the unique address U_AD contained in the same second operational communication as its own operational address. In this way, the slave device $20_i$ passes from an unaddressed state to an addressed state.

Finally, according to the method, if the master device 10 has received in step C at least one identification communication, overlapped with at least one further identification communication, then steps A to D are repeated. In other words, a new iteration of the steps A to D is performed if the master device 10 has received in step C at least one such identification communication, overlapped or not overlapped with at least one further identification communication, that is to say, even if it only receives one or more corrupted responses. For this reason, the method does not reiterate steps A to D when during step C the master device 10 no longer receives any response, this fact being assumed to correspond to a situation in which all the slave devices $20_i$ of the plurality of slave devices 20 are in the addressed state. The method may terminate, therefore, once all the slave devices $20_i$ of the plurality of slave devices 20 are in the addressed state and do not respond to the first operational communication that the master device 10 emits in step A.

Preferably, the serial communication protocol can be a serial version of the Modbus protocol. For example, this serial communication protocol can be the Modbus RTU version or the Modbus ASCII serial version.

Preferably, step C can only begin at the end of the overall period Tc. Advantageously, in this way the master device 10 waits as long as necessary to receive any responses from the slave devices $20i$ of the plurality of slave devices 20 which are in the unaddressed state.

According to this possible aspect of the invention, the initial instant $I_t$ and the final instant $I_f$ define the maximum time period $T_{max}$ and the step C is executed not before a time equal to the sum of the time period T and the maximum time period $T_{max}$ has elapsed since the sending of the operational communication in the step A, so that the step C is executed once all the time necessary to receive the response communications from all the slave devices $20_i$ which are in the unaddressed state has elapsed. Preferably, therefore, step C starts after a time equal to the total time period $T_c$ has elapsed. In other words, the master device 10 remains on hold for this total time period $T_c$, so that it has received all possible identification communications before sending a second operational communication to the plurality of slave devices 20. The step C is therefore advantageously conducted once all the possible identification communications have been received from the plurality of slave devices 20. In this way, advantageously, the possibility of receiving at least one identification communication from the master device 10 before the start of step C is maximised. In other words, advantageously, the assignment of an operational address does not take place until all possible identification communications have been received by the master device 10. The step B is not, therefore, interrupted by a premature assignment of an operational address to just the slave devices which were the first to start transmitting their identification communication. According to one possible aspect, the operational communication of step A may comprise a maximum value R that can be assigned to the random number r. That is to say, the master device 10 can indicate the maximum number of transmission instants $I_t$ within the maximum time period $T_{max}$. This maximum value R therefore corresponds to the maximum number of times that the interval T can be repeated entirely within the overall time period $T_c$.

In particular, the duration of the total time period $T_c$ is equal to the duration of the time period T for a number of times equal to this maximum value R. The total time period $T_c$ is therefore composed of a number of time slots, corresponding to the time interval T, equal to the maximum value R; where each time slot starts at a certain transmission instant $I_t$ and lasts for the time interval T. Each time slot represents the time window within which the transmission of the unique identifier U_ID by at least one slave device $20_i$ of the plurality of slave devices 20 may occur.

For example, if $T_{max}$ has a duration of 300 ms and T has a duration of 30 ms, then the maximum value R is 10 and the total time period $T_c$ comprises 10 time slots. According to this same possible aspect, moreover, this maximum value R may be greater than or equal to the number S of slave devices $20_i$ of the plurality of slave devices 20. Preferably, therefore, at least one slot is defined for each slave device $20_i$ of the plurality of slave devices 20. In this way, the probability is reduced that, even if all slave devices $20_i$ of the plurality of slave devices 20 are in an unaddressed state, the complete overlapping of at least two identification communications within the same slot will occur. Therefore, this advantageously allows the procedure to be speeded up.

It follows, advantageously, that the number of iterations that the method must perform before each slave device $20_i$ of the plurality of slave devices is assigned an operational address can be reduced.

However, as the number of slots, and consequently the total time period $T_c$, increases, the overall duration of the execution of the method according to the invention may increase.

Thus, in general, in accordance with the invention, the duration of the maximum time period $T_{max}$ and the time period T and/or the maximum value R and/or the total time period $T_c$ are chosen according to the contingent conditions of implementation of the method.

In particular, a greater value of the maximum time span $T_{max}$ will lengthen the wait by the master device 10 for response communications from the slave devices $20_i$ but will reduce the probability of overlapping of such response communications, that is, corrupted communications and, therefore, reiterations of steps A to D.

In order to define a possible compromise between the number of slots, which as mentioned above corresponds to the maximum value R that can be assigned to the random number r, and the probability that at least one correct answer occurs, that is, that the master device 10 does not receive only corrupted responses, it is possible to use the statistics formula known as the "birthday paradox" (or "birthday problem").

According to the statistical formula of the "birthday paradox" the probability that at least one correct answer is received from the master device 10 is equal to:

$$P_{1c} = 1 - \frac{R!}{R^s(R-S)!}$$

Where, in a per se known manner:

R is the maximum value that can be assigned to the random number r and is equal to the number of slots;

S is the number of slave devices that are in an unaddressed state prior to step A of the above-mentioned method.

Applying this formula, for example if the number of slave devices S that are in an unaddressed state before step A is 5 and the maximum number that can be assigned to the random number is 5 (so there are 5 slots), the probability that a corrupted response is received is equal to:

$P_{1c}=1-(4/5 \times 3/5 \times 2/5 \times 1/5)=1-24/625=1-0.0384=0.9616=96.16\%$ The maximum value that can be assigned to the random number, that is, the number of slots, R can be chosen so that the probability of a corrupt response occurring is less than 50%, or less than 30%, or less than 20%, depending on the contingent requirements of the implementation of the invention.

According to a possible aspect of the invention, the initial instant $I_i$ may be the instant at which the plurality of slave devices 20 receives the operational communication of the step A. That is to say, the step B may commence as soon as the slave devices $20_i$ of the plurality of slave devices 20 receive the operational communication from the master device 10. If a slave device $20_i$ assigns the value 0 to the random number r, then the identification communication containing the unique identifier U_ID of that slave device $20_i$ is sent substantially from the instant when the same operational communication is received, that is, net of the time required for the slave device $20_i$ to process the first operational communication and send the relative identification communication. In this way, advantageously, no waiting times are created between step A and the start of step B.

According to a possible aspect of the invention, in step D each slave device $20_i$ of the plurality of slave devices which has acquired as its operational address the unique address U_AD contained in the second operational communication may send a communication confirming that the state has been changed from the unaddressed state to the addressed state. Thus, in step D, each slave device $20_i$ which has switched from an unaddressed state to an addressed state may, preferably, transmit a confirmation communication to the master device 10. This confirmation communication contains the unique address U_AD set by a $20_i$ slave device as its operational address. In this case, the method may terminate when the master device 10 does not receive any confirmation communication.

Alternatively, for example, the method may terminate when in said step B the master device 10 receives neither identification communications nor a corrupted response. That is to say, the method may terminate when in step B the master device 10 does not receive any identification communication, alone or superimposed on at least one further identification communication.

According to a possible aspect of the invention, the time interval T may have a duration of equal to the duration of the identification communication added to the prefixed duration of an error interval, wherein the prefixed duration of that error interval is less than the duration of the identification communication. For example, this predetermined duration may be 5 ms. Even more preferably, in the case of a serial version of the Modbus protocol, the duration of the interval T can also include the "inter frame delay Modbus", that is, a silence time between one communication and the next. Even more preferably, this "inter frame delay Modbus" has a duration at least equal to 1750 µs or the time required for the communication of 3.5 characters. In this way, the possibility that a first identification communication is not transmitted completely within a first slot and that a second identification communication, subsequent to the first identification communication, may overlap with the latter is reduced.

According to a possible aspect of the method according to the invention, during the step C the master device 10 may store in a list the unique identifier U_ID contained in each identification communication, which does not form a corrupted response, according to the order of arrival. In other words, the master device 10 may compile a list listing the unique identifier U_ID contained in the received identification communications in the order in which they arrive. The serial numbers U_ID contained in identification communications, which have not formed a corrupted response, can then be listed in order of arrival. The first unique identifier U_ID introduced in the list may correspond to the one contained in the first identification communication received by the master device 10 correctly, that is, not overlapping with another identification communication that is, forming a corrupted response, the second unique identifier U_ID introduced in the list may correspond to the one contained in the second identification communication received by the master device 10 correctly, and so on.

Thus, the master device 10 can progressively match a unique address U_AD to each unique identifier contained in the list. That is to say, the master device 10 can gradually, that is, following the order of the list, associate a unique address U_AD with each unique identifier. Thus, the first unique address U_AD can be coupled to the first unique identifier U_ID in the list, the second unique address U_AD can be coupled to the second unique identifier U_ID in the list, and so on. In particular, in the case of a serial version of the Modbus protocol, the unique address U_AD can be the first value in the set of natural numbers between 1 and 247 that is not already coupled with a unique identifier of a slave device $20_i$. In other words, in such a case, the master device 10 progressively couples the first unique address U_AD, in the form of an integer between 1 and 247, which is free, that is, not previously assigned to the first unique identifier transmitted to it.

Then, in an orderly fashion, the master device 10 gradually uses the operational addresses which can be assigned.

The invention also comprises a master device 10 configured and/or programmed to perform step A and step C of the method according to the invention.

Finally, the invention comprises an electronic system 1 with architecture of the "master/slave" type operating according to a serial communication protocol comprising at least one master device 10 configured and/or programmed to perform step A and step C of the method according to the invention and a plurality of slave devices 20 connected to the master device 10 for mutual communication according to the serial communication protocol.

The method according to the invention is particularly applicable to an electronic system 1 with a "master/slave" type architecture, operating according to a serial communication protocol, of refrigeration apparatuses. In particular, in such applications, the master device 10 may be a control device or an area supervisor; while the plurality of slave devices 20 may comprise, a compressor, that is, its controller with inverter, devices equipped with temperature or pressure detection probes, fans, I/O expansions, other controls.

The invention claimed is:

1. A method for assigning an operational address to at least one slave device of a plurality of slave devices by a master device according to a serial communication protocol; wherein the serial communication protocol is a serial version of the Modbus protocol and wherein during the step C the master device stores in a list the unique identifier (U_ID) contained in each of the identification communications that does not form a corrupted response according to the order of arrival and progressively matches a unique address (U_AD) to each unique identifier (U_ID) contained in the list; wherein the unique address (U_AD) is the first value in the set of natural numbers between 1 and 247 which is not already paired with a unique identifier (U_ID) of a slave device;

wherein each slave device of the plurality of slave devices has a unique identifier (U_ID), is connected to the master device for mutual communication and is configured to be set selectively in an addressed state or in an unaddressed state, wherein in the addressed state the slave device has an assigned operational address and in the unaddressed state it is without an operational address;

wherein the master device is configured to send an operational communication in a broadcast mode;

wherein the slave device is configured to execute commands contained in an operational communication in the broadcast mode;

the method comprises the following steps:

a step A wherein the master device sends a first operational communication in the broadcast mode containing a command to transmit the unique identifier (U_ID) at a transmission instant ($I_t$); wherein the transmission instant ($I_t$) is included between an initial instant (Ii) and a final instant ($I_f$) and has a value, in units of time with respect to the initial instant (Ii), equal to the product of a random number (r) for a predefined time interval (T); wherein the random number (r) is a natural number;

a step B wherein each slave device of the plurality of slave devices having received the first operational communication, if it is in the unaddressed state, assigns a value to the random number (r) and transmits, starting from the transmission instant ($I_t$), an identification communication containing the unique identifier (U_ID) of the slave device; wherein the time interval (T) has a duration equal to a duration of the identification communication added to a prefixed duration of an error interval, wherein the prefixed duration of the error interval is less than the duration of the identification communication, so that if at least a first of the slave devices and at least a second of the slave devices each transmit a respective identification communication at a first of the initial instants ($I_{t,a}$) and at a second of the initial instants ($I_{t,b}$) respectively, the master device either receives a corrupted response formed by a substantially complete overlap of the identification communications of the first and the second slave devices if the first initial instant ($I_{t,a}$) is equal to the second initial instant ($I_{t,b}$), or it receives the non-overlapping identification communications of the slave devices if the first initial instant ($I_{t,a}$) is different from the second initial instant ($I_{t,b}$);

a step C wherein the master device for each of the identification communications, which it receives and which does not form one of the corrupted responses, transmits in the broadcast mode a second operational communication;

wherein each of the second operational communications consists of a response to each of the identification communications with respect to which it contains the same unique identifier (U_ID) and further contains a unique address (U_AD) to be associated with the slave device of the plurality of slave devices having the unique identifier (U_ID);

a step D wherein each slave device of the plurality of slave devices which receives the second operational communication, if it is in the unaddressed state and the relative unique identifier (U_ID) coincides with the unique identifier (U_ID) contained in the second operational communication then it acquires as its operational address the unique address (U_AD) contained in the second operational communication and passes to the addressed state;

wherein if the master device has received in the step C at least one of the identification communications, superimposed or not superimposed on at least a further of the identification communications, then the steps from step A to step D are repeated.

2. The method according to claim 1, wherein the initial instant ($I_t$) and the final instant ($I_t$) define a maximum time period ($T_{max}$) and the step C is performed not earlier than a time equal to the sum of the time period (T) and the maximum time period ($T_{max}$) has elapsed since the sending of the operational communication in the step A.

3. The method according to claim 2, wherein the operational communication of the step A comprises a maximum value (R) assignable to the random number (r); and wherein the maximum value (R) is greater than or equal to the number of slave devices (S) of the plurality of slave devices.

4. A master device configured and/or programmed to execute the step A and the step C of the method according to claim 3.

5. The method according to claim 2, wherein the initial instant ($I_t$) is the instant at which the plurality of slave devices receives the operational communication in broadcast mode of step A.

6. The method according to claim 2, wherein the time interval (T) has a duration equal to the duration of the identification communication added to a prefixed duration of an error interval, wherein the prefixed duration of the error interval is less than the duration of the identification communication.

7. The method according to claim 1, wherein the operational communication of the step A comprises a maximum value (R) assignable to the random number (r); and wherein the maximum value (R) is greater than or equal to the number of slave devices (S) of the plurality of slave devices.

8. The method according to claim 1, wherein the initial instant ($I_t$) is the instant at which the plurality of slave devices receives the operational communication in broadcast mode of step A.

9. The method according to claim 1, wherein in the step D each slave device of the plurality of slave devices which has acquired as its operational address the unique address (U_AD) contained in the second operational communication, sends a communication confirming a change of state from the addressed state to the unaddressed state.

10. The method according to claim 9, wherein the serial communication protocol is a serial version of the Modbus protocol and wherein during the step C the master device 10 stores in a list the unique identifier (U_ID) contained in each of the identification communications that does not form a corrupted response according to the order of arrival and progressively matches a unique address (U_AD) to each unique identifier (U_ID) contained in the list; wherein the unique address (U_AD) is the first value in the set of natural numbers between 1 and 247 which is not already paired with a unique identifier (U_ID) of a slave device.

11. A master device configured and/or programmed to execute the step A and the step C of the method according to claim 10.

12. An electronic system having an architecture of the "master/slave" type operating according to a serial communication protocol comprising at least one master device according to claim 11 and a plurality of slave devices connected to the master device for mutual communication.

13. A master device configured and/or programmed to execute the step A and the step C of the method according to claim 10, wherein the operational communication of the step A comprises a maximum value (R) assignable to the random number (r); and wherein the maximum value (R) is greater than or equal to the number of slave devices (S) of the plurality of slave devices, and wherein the initial instant ($I_t$) and the final instant ($I_t$) define a maximum time period ($T_{max}$) and the step C is performed not earlier than a time equal to the sum of the time period (T) and the maximum time period ($T_{max}$) has elapsed since the sending of the operational communication in the step A.

14. An electronic system having an architecture of the "master/slave" type operating according to a serial communication protocol comprising at least one master device according to claim 13 and a plurality of slave devices connected to the master device for mutual communication.

15. The method according to claim 1, wherein the serial communication protocol is a serial version of the Modbus protocol.

16. The method according to claim 15, wherein during the step C the master device 10 stores in a list the unique identifier (U_ID) contained in each of the identification communications that does not form a corrupted response according to the order of arrival and progressively matches a unique address (U_AD) to each unique identifier (U_ID) contained in the list; wherein the unique address (U_AD) is the first value in the set of natural numbers between 1 and 247 which is not already paired with a unique identifier (U_ID) of a slave device.

17. A master device configured and/or programmed to execute the step A and the step C of the method according to claim 1.

18. An electronic system having an architecture of the "master/slave" type operating according to a serial communication protocol comprising at least one master device according to claim 17 and a plurality of slave devices connected to the master device for mutual communication.

* * * * *